United States Patent Office 3,200,167
Patented Aug. 10, 1965

3,200,167
PROCESS FOR THE REMOVAL OF ACETYLENIC HYDROCARBONS BY SELECTIVE CATALYST HYDROGENATION
Manfred Reich, Recklinghausen, Germany, assignor to Chemische Werke Huls, A.G., Marl, Kreis Recklinghausen, Germany
No Drawing. Filed July 2, 1962, Ser. No. 207,006
Claims priority, application Germany, July 6, 1961, C 24,543
14 Claims. (Cl. 260—681.5)

This invention relates to the removal of acetylenes from a gaseous diolefin fraction, particularly to a process wherein the acetylenes are selectively hydrogenated with the aid of a special catalyst.

From the thermal cracking or dehydrogenation of petroleum or petroleum cuts, there can be produced fractions which contain valuable quantities of diolefins such as butadiene and isoprene. These fractions contain, besides saturated hydrocarbons and olefins, acetylenic hydrocarbons, which compounds are undesirable impurities for many application purposes. Consequently, it is necessary to remove these acetylenic impurities, to a large extent, before any subsequent reaction of the diolefin fraction.

By conventional customary separation processes, such as extraction and distillation, deleterious amounts of acetylenic hydrocarbons are still retained by the diolefin fraction. The butadiene fraction, for example, contains after distillation, 0.01 to 0.2% vinyl and ethyl acetylenes due to the fact that these latter compounds exhibit boiling points which are very close to butadiene. When such a butadiene fraction is subjected to a subsequent treatment, such as, for example, polymerization, the concentration of these minor amounts of acetylenic impurities can increase considerably in the unreacted diolefins residue which is to be reclaimed.

Methods are known, whereby acetylenic hydrocarbons are removed in the gaseous state from diolefin-containing hydrocarbon mixtures by means of hydrogenation. This removal may be achieved by adding a certain amount of hydrogen at 100 to 250° C. with the aid of a mixed catalyst, having copper as the main component, and as the secondary component, a metal, the oxide of which can be reduced with hydrogen at a temperature below 550° C. (U.S. Patent 2,426,604). Unfortunately, in said process there occurs significant losses of the conjugated diolefins, such as butadienes, because up to several percent of same are hydrogenated along with the acetylenic compounds. Iron-containing catalysts exhibit a somewhat better selectively (U.S. 2,426,604, U.S. 2,775,634); however, because of the necessarily high hydrogenation temperature, i.e., 175 to 345°, polymeric impurities accumulate on the surfaces of the catalyst, thereby significantly shortening the catalyst life.

Besides hydrogenation in the gaseous phase, hydrogenation of liquid, butadiene-containing $C_4$-fractions is also known. (German 1,095,808.) This system is also relatively unsatisfactory because of the losses of conjugated butadiene. As a matter of fact, even with incomplete acetylene removal, losses of up to several percent of butadiene-1,3 occur.

The principal object of this invention, therefore, is to provide a process which is highly selective for the removal of acetylenic compounds from diolefins, and which does not result in any significant losses of the diolefins.

Another object of this invention is to provide a novel catalyst composition for the selective hydrogenation of acetylenic compounds.

Other objects and advantages of the present invention will become apparent upon further study of the specification and appended claims.

To achieve the objects of this invention, it has been discovered that the removal of acetylenes from diolefin-containing hydrocarbon mixtures can be conducted particularly selectively, if the gaseous hydrocarbon mixture is led over a mixed catalyst at a temperature of 30 to 250° C. and under a pressure of 0 to 30 atmospheres (gage) pressure. The catalyst is composed of copper as the main constituent mixed with oxides, and/or hydroxides, and/or salts of those metals having oxides which cannot be reduced with hydrogen at a temperature below 600° C.

It is appreciated that this invention is applicable to any process wherein it is desired to hydrogenate acetylene or other acetylenic compounds. Specifically, however, this invention is advantageously employed to separate acetylenic compounds from gases containing the same, together with other gases which are capable of hydrogenation, such as diolefins. In such a diolefinic mixture, any amount of hydrogen may be present, but, of course, if there is no hydrogen present, a sufficient amount must be added to the mixture so that there are at least equimolar quantities of hydrogen and the acetylenic compounds to be removed. Under normal circumstances, the amount of acetylenic compounds exist in volumetric concentration of about 0.005 to 1% of the total quantity of gas.

The temperature of hydrogenation in this invention is important, inasmuch as it has been discovered that the present novel catalyst system permits relatively lower operating temperatures, thereby avoiding an accumulation of polymeric impurities on the catalyst surface. The temperatures that are employed lie between 30 and 250° C., the specific temperature being preferentially dependent on the amount of hydrogen gas present in the gaseous mixture. For example, if the amount of hydrogen is high, e.g., 20 mol percent, the temperature should preferably be 80–110° C. On the other hand, if the percentage of hydrogen is low, e.g., 1 mol percent, a temperature of 100–200° C. is preferred.

It can be appreciated that space velocities and residence times and throughputs can be varied in accordance with the specific area of the catalyst, as well as the desired purity of the gas. In general, the flow rate of the gaseous mixture through the catalyst depends on the acetylenic content of the gas. If the acetylenic content decreases, the flow rate can be increased. For example, with an acetylenic content of 0.005% by volume, a flow rate of 1000 normal liters of gas per liter of catalyst per hour can be maintained; whereas with an acetylenic content of 1% by volume, it is desirable to maintain a flow rate of about 200 normal liters of gas per liter of catalyst per hour to obtain a similar removal of the acetylene.

The reaction can be conducted at atmospheric pressure or at any desirable pressure at which the mixture to be purified exists in the gaseous phase, the preferred pressure range being between 0 and 30 atmospheres (gage).

The mixed catalysts of this invention consist essentially of copper on the one hand, and a compound of a second metal on the other hand. The nature of the second metal is characterized by the fact that the oxide of said metal cannot be reduced by hydrogen at temperatures below 600° C. Thus, in contradistinction to the prior art, the active component, aside from copper, in this invention does not exist in the elemental state in the catalyst mixture.

The preferred group of metallic compounds which meet the requirements of the second component of the mixed catalyst are compounds of metals of the first and second groups of Mendeleeff's Periodic Table, particularly the compounds of sodium, lithium, calcium, barium and magnesium.

Other compounds of metals of the first and second groups of the Periodic Table are suitable as the component, for example, potassium, rubidium, cesium, beryllium, strontium.

Many different types of compounds of the second metal can be utilized such as oxides, hydroxides and salts. Preferred compounds are carbonates, e.g. calcium carbonate, magnesium carbonate and lithium carbonate; oxides, e.g. calcium oxide, magnesium oxide and barium oxide; and hydroxides such as sodium hydroxide. Other suitable compounds are acetates, formates, nitrates, e.g. lithium acetate, potassium acetate; lithum formate, potassium formate; lithium nitrate, potassium nitrate.

The weight ratio of elemental copper to the metallic portion of the second component can vary within a limited range. In general, the ratio is 5–50 parts copper to 0.01 to 50 parts of the meatllic portion of the second component, the preferred ratio being 15 parts by weight copper to 1–2 parts of the metallic portion of the second component.

It is also generally economically desirable to distribute the mixed catalyst on a carrier such as silica gel, Stuttgart mass (a silica containing small amounts of oxides of sodium, iron, calcium and magnesium), pumice, kaolin, aluminum oxide etc. The percent by weight concentration of the catalyst components in the carrier are 5–50% elemental copper, 0.1–50% by weight of the metallic portion of the second component, the preferred ranges being 15% and 1–2% respectively.

The mixed catalysts are produced by impregnating the carrier material with a solution or suspension of copper salts such as copper carbonate, copper formate or copper nitrate and with a solution or suspension of an oxide, hydroxide, carbonate, nitrate, or other salt of one or more metals which cannnot be reduced by hydrogen at below 600° C. The carrier is then dried to remove the solvent or suspending medium, whichever is the case.

In some instances e.g. by using nitrates, formiates it is preferable to subject the catalyst to an intermediate thermal treatment at a temperature of about 500° C. By this thermal treatment to said compounds decompose.

Before the catalyst functions properly, it is necessary to reduce the copper to the metallic state. Of course, it is possible to accomplish this in the hydrogenation reaction chamber, employing the hydrogen in the feed stream as the source of hydrogen for the copper reduction. It is far more preferable, however, to reduce the copper in the catalyst in a separate step in an hydrogen atmosphere at about 150–200° C. by conventional methods, as disclosed, for example, in "Catalysis," vol. I, page 325 ("Preparation of Copper Catalysts," P. H. Emmett), Reinhold Publishing Corporation, N.Y., 1954.

The catalyst composition of this invention can be utilized on an average of 1–5 weeks between 2 regenerations, depending on the composition of the gas to be purified. The regeneration procedure is conducted by reacting said catalyst with steam at 200° C. for about 12 hours, and with oxygen containing gases at 200–400° C., until all burning ingredients are removed, then reducing the resultant catalyst with hydrogen at 150–200° C.

As stated in the preceeding description of the invention, one of the major advantages of the present invention is that selective hydrogenation can be effected, with practically any content of hydrogen present in the gas stream. The only provision that must be made is to ensure a slight excess over an equimolar concentration of hydrogen as compared to the acetylenes, this slight excess being in the range of 10–20%. During this process, in which the acetylenes are removed to an extent that they are no longer detectable by known analytical methods, the diolefins in the feed mixture are substantially unchanged. Consequently, this invention makes it possible to selectively hydrogenate and remove acetylenes from gaseous feeds containing diolefins and a substantial concentration of hydrogen without any significant hydrogenation of the diolefins.

It is believed that the preceding description of the invention enables one skilled in the art to practice this invention without the necessity of further information. The following preferred specific embodiments, therefore, are merely presented to illustrate the invention, and accordingly are not inteneded to be limitative of the remainder of the specification or appended claims in any way whatsoever.

Example 1

A $C_4$-fraction containing 93.4 mol percent butadiene-1,3 and 0.1244% of vinyl-, ethyl- and methyl acetylenes was used as the starting material. After 1 percent by volume of hydrogen was added, this fraction was led in the gaseous state over one liter of catalyst with a space velocity of 400 Nl/h. The temperature in the hydrogenation chamber was 130 to 140° C.

The catalyst was prepared by the simultaneous application of copper carbonate and calcium carbonate onto pumice with the assistance of water glass so that the content of copper was 14.9% and that of calcium 2.0%. Prior to use, the catalyst was reduced with hydrogen at 200° C.

After the gas was passed through the catalyst in the hydrogenation chamber, an analysis of the hydrocarbon mixture showed the presence of 93.3 mol percent of butadiene-1,3, and of most importance, the presence of vinyl-, ethyl- and methyl acetylenes was no longer detectable (content less than 0.0003%).

Example 2

Through 1 liter of a catalyst prepared as in Ex. 1 which, however, had been compounded with a like amount of magnesium carbonate instead of calcium carbonate so that it contained 2.0% Mg, there is passed at a space velocity of 410 Nl/h., a gas mixture of the following composition:

| | |
|---|---|
| Hydrogen | 19.1 |
| Hydrogen | 19.1 |
| n-Butane | 0.9 |
| 1- and iso-butane | 1.5 |
| Trans-butene-2 | 0.4 |
| Cis-butene-2 | 0.2 |
| Butadiene-1,3 | 77.7 |
| Butadiene-1,2 | 0.1 |
| Vinyl-, ethyl- and methylacetylene | 0.1250 |

The hydrogenation temperature in the reaction chamber was kept at 80 to 90° C. After leaving the chamber, the mixture had the following composition, in mol percent:

| | |
|---|---|
| Hydrogen | 19.1 |
| n-Butane | 0.9 |
| 1- and iso-butene | 1.6 |
| Trans-butene-2 | 0.4 |
| Cis-butene-2 | 0.4 |
| Butadiene-1,3 | 77.5 |
| Butadiene-1,2 | 0.1 |
| Vinyl-, ethyl- and methylacetylene | <0.0003 |

Thus, the butadiene-1,3 content remained practically unchanged, whereas the acetylene compounds were removed to such an extent that they were no longer detectable (<0.0003%).

Example 3

A $C_4$-fraction of the following composition, in mol percent:

| | |
|---|---|
| Hydrogen | 9.2 |
| Propene and iso-butane | 0.4 |
| n-Butane | 53.6 |
| 1- and iso-butene | 9.4 |
| Trans-butene-2 | 8.7 |
| Cis-butene-2 | 7.5 |
| Butadiene-1,3 | 11.2 |
| Vinyl-, ethyl- and methylacetylene | 0.0322 | was led at a space velocity of 880 Nl/h. over 1 liter of a catalyst prepared according to Example 2. The hydrogenation temperature in the furnace was 90 to 100°

C. At the outlet of the furnace the gas composition analyzed as follows:

| | |
|---|---|
| Hydrogen | 9.1 |
| Propene and iso-butane | 0.5 |
| n-Butane | 53.2 |
| 1- and iso-butene | 9.6 |
| Trans-butene-2 | 9.0 |
| Cis-butene-2 | 7.5 |
| Butadiene-1,3 | 11.1 |
| Vinyl-, ethyl- and methylacetylene | <0.0003 |

Thus, the butadiene-1,3 content was practically unchanged, whereas the acetylene compounds were removed to such an extent that they were no longer detectable (<0.0003%).

*Example 4*

A C$_4$-fraction containing 95.3 mol percent butadiene-1,3, 1.5 mol percent hydrogen, and 0.1480 mol percent of acetylenes (vinyl, ethyl, and methyl) was led under normal pressure over 1 liter of a catalyst which was prepared in a manner analogous to Example 1, but compounded with a like amount of lithium carbonate instead of calcium carbonate, so that it contained 1.8% Li and 15.0% Cu. The gaseous mixture was led over the catalyst at a space velocity of 400 Nl/h., the temperature in the hydrogenation furnace being 140 to 150° C. After leaving the furnace, the gaseous mixture contained 95.1 mol percent of butadine. Acetylenes were no longer detectable (<0.0003 mol percent).

*Example 5*

A hydrocarbon fraction containing 95.1 percent by weight of isoprene and 0.33 percent by weight of methyl butyne and methyl butenyne as impurities to be removed, was used as the starting material. This fraction was led in a gaseous state over 1 liter of a catalyst at a space velocity of 400 Nl/h., which had been prepared according to Example 2, with the exception that silica gel was used as a carrier instead of pumice. Before the reaction chamber, about 20 percent by volume of hydrogen was admixed to the gas. The hydrogenation temperature in the chamber was 80 to 90° C. Of the resultant treated stream, 95.0% consisted of isoprene. Methyl butyne and methyl butenyne were no longer detectable.

*Example 6*

A C$_4$-fraction containing 93.5 mol percent of butadiene, 3.0 mol percent of hydrogen, and 0.1530 mol percent of acetylenes (vinyl-, ethyl- and methyl acetylene) was passed under a pressure of 6.5 atmospheres (gage) over 100 ml. of a catalyst which had been prepared according to Example 2. The gas mixture was sent through at a space velocity of 500 Nl gas per liter of catalyst per hour, and the temperature in the hydrogenation furnace was kept at 110 to 120° C. After leaving the furnace, the acetylenes were removed to the extent of less than 0.0003% whereas the final butadiene-1,3 content of 93.3 mol percent remained practically constant.

*Example 7*

Example 1 was repeated with a catalyst prepared by the simultaneously application of copper carbonate and barium carbonate onto pumice, thereby obtaining similar results.

*Example 8*

Example 1 was repeated with a catalyst prepared by the simultaneous application of copper carbonate and barium hydroxide onto pumice, thereby obtaining similar results.

*Example 9*

Example 1 was repeated with a catalyst prepared by the simultaneous application of copper carbonate and beryllium oxide onto pumice, thereby obtaining similar results.

*Example 10*

This example is to explain the selectivity of the catalysts under this invention as compared with those known so far.

(a) A butadiene fraction containing 99.3 mol percent of butadiene-1.3 and 0.0360 mol percent of higher acetylenes (ethyl acetylene prevailing) was used as the starting material. This fraction in the gaseous state was led at a space velocity of 500 Nl/h. through one liter of catalyst, simultaneously admixing 2% by volume of hydrogen before the reaction chamber. The temperature in the hydrogenation reactor was 120–130° C.

The catalyst was prepared according to the specifications contained in U.S. Patent 2,426,604, column 4, lines 9 through 25, by the simultaneous application of aqueous solutions of copper nitrate and nickel nitrate onto silica gel so that the finally reduced catalyst contained 12.5% by weight of copper and 1.8% by weight of nickel. After drying, the catalyst was subjected for about 24 hours to a heat treatment in an air flow whose temperature was gradually raised up to 600° C. for the purpose of decomposing the nitrates. Prior to use, the catalyst was reduced with hydrogen at 200–300° C. for 24 hours.

When leaving the hydrogenation chamber the butadiene effluent, rehydrogenated by passing through this catalyst, contained 97.7 mol percent of butadiene-1,3 based on the hydrogen feed but disregarding the additionally admixed hydrogen in the analysis. As a result the loss of butadiene was 1.6 mol percent. Acetylene was no longer detectable (<0.003%).

(b) The same conditions as specified under (a) above were applied to this test except for substituting chromium-VI-oxide for nickel nitrate when preparing the catalyst so that the finally reduced catalyst showed a copper content of 14.5% by weight and a chrome content of 2.0% by weight. The butadiene effluent leaving the reactor contained 97.8 mol percent of butadiene-1,3, leaving the hydrogen out of count. As a result the butadiene loss was 1.5 mol percent. Acetylene could not be traced (<0.0003%). The hydrogenation temperature was 120–130° C.

(c) The same conditions as specified under (a) above were applied to this test except for substituting magnesium nitrate for nickel nitrate when preparing the catalyst according to the present invention, so that the finally reduced catalyst showed a copper content of 14.1% by weight and a magnesium content of 2.0% by weight. The hydrogenation temperature was 120–130° C. The butadiene effluent contained 99.2 mol percent of butadiene-1,3 leaving the hydrogen out of count and thus for all practical purposes, showed no loss of butadiene (0.1 mol percent). Acetylene could no longer be detected (<0.0003%)

From the comparative tests it is quite obvious that the catalyst according to this invention as used in test (c) is clearly superior in selectivity to the catalysts used in tests (a) and (b). Notwithstanding some excess hydrogen (2% by volume), there is practically no loss of butadiene in test (c).

*Example 11*

Example 10 was repeated with a catalyst prepared by the simultaneous application of copper formate and potassium acetate onto silica gel thereby obtaining similar results.

From the foregoing description, one skilled in the art can easily ascertain the essential characteristics of this invention, and without departing from the spirit and scope thereof, can make various changes and modifications to the invention to adapt it to various usages and conditions. Consequently, such changes and modifications are properly, equitably, and intended to be within the full range of equivalence of the following claims.

What is claimed is:

1. A mixed catalyst composition consisting essentially of, in parts by weight, as active components, 5-50 parts metallic copper, per 0.1-50 parts based on the metallic portion, of a compound of a metal, the oxide of which being unreducible with hydrogen to the metal at temperatures below 600° C., said compound being selected from the group consisting of oxides, hydro-oxides and, carbonates of a metal selected from the group consisting of lithium, sodium, potassium, rubidium, cesium, beryllium, magnesium, calcium, strontium, and barium.

2. The catalyst composition of claim 1 wherein the weight ratio of the metallic copper to the metal portion of the metal compound is about 15 to 1-2 respectively.

3. The catalyst composition of claim 2 wherein the metal portion of the metal compound is calcium.

4. The catalyst composition of claim 2 wherein the metal portion of the metal compound is magnesium.

5. The catalyst composition of claim 2 wherein the metal portion of the metal compound is lithium.

6. A process for the hydrogenation of acetylenic hydrocarbons, which process comprises the step of passing a gaseous stream containing acetylenic hydrocarbons and an excess above an equimolar quanttiy of hydrogen, in contact with the catalyst composition of claim 1 at a temperature of 30-250° C.

7. A process for the hydrogenation of acetylenic hydrocarbons, which process comprises the step of passing a gaseous stream containing acetylenic hydrocarbons and an excess above an equimolar quantity of hydrogen, in contact with the catalyst composition of claim 2 at a temperature of 30-250° C.

8. A process for the hydrogenation of acetylenic hydrocarbons, which process comprises the step of passing a gaseous stream containing acetylenic hydrocarbons and an excess above an equimolar quantity of hydrogen, in contact with the catalyst composition of claim 3 at a temperature of 30-250° C.

9. A process for the hydrogenation of acetylenic hydrocarbons, which process comprises the step of passing a gaseous stream containing acetylenic hydrocarbons and an excess above an equimolar quantity of hydrogen, in contact with the catalyst composition of claim 4 at a temperature of 30-250° C.

10. A process for the hydrogenation of acetylenic hydrocarbons, which process comprises the step of passing a gaseous stream containing acetylenic hydrocarbons and an excess above an equimolar quantity of hydrogen in contact with the catalyst composition of claim 5 at a temperature of 30-250° C.

11. A process for the selective removal of acetylenic hydrocarbons from a gaseous mixture comprising conjugated diolefins, and a content of hydrogen in excess of an equimolar concentration of the acetylenic hydrocarbons, which process comprises passing said mixture in contact with the catalyst composition of claim 1 at a temperature of 30-250° C., thereby removing all determinable traces of said acetylenic hydrocarbons and without substantially changing the concentration of the conjugated diolefins.

12. A process for the selective removal of acetylenic hydrocarbons from a gaseous mixture comprising conjugated diolefins, and a content of hydrogen in excess of an equimolar concentration of the acetylenic hydrocarbons, which process comprises passing said mixture in contact with the catalyst composition of claim 2 at a temperature of 30-250° C., thereby removing all determinable traces of said acetylenic hydrocarbons and without substantially changing the concentration of the conjugated diolefins.

13. A process for the selective removal of acetylenic hydrocrbons from a gaseous mixture comprising conjugated diolefins, and a content of hydrogen in excess of an equimolar concentration of the acetylenic hydrocarbons, which process comprises passing said mixture in contact with the catalyst composition of claim 3 at a temperature of 30-250° C., thereby removing all determinable traces of said acetylenic hydrocarbons and without substantially changing the concentration of the conjugated diolefins.

14. A process for the selective removal of acetylenic hydrocarbons from a gaseous mixture comprising conjugated diolefins, and a content of hydrogen in excess of an equimolar concentration of the acetylenic hydrocarbons, which process comprises passing said mixture in contact with the catalyst composition of claim 5 at a temperature of 30-250° C., thereby removing all determinable traces of said acetylenic hydrocarbons and without substantially changing the concentration of the conjugated diolefins.

References Cited by the Examiner

UNITED STATES PATENTS

| | | | |
|---|---|---|---|
| 2,426,604 | 9/47 | Frevel | 260—681.5 |
| 2,517,223 | 8/50 | Mantell | 252—476 |
| 2,771,380 | 11/56 | Coleman et al. | 252—476 |
| 2,864,873 | 12/58 | Miller et al. | 252—476 |
| 3,052,735 | 9/62 | Hodgson et al. | 252—476 |
| 3,076,858 | 2/63 | Frevel et al. | 260—681.5 |

ALPHONSO D. SULLIVAN, *Primary Examiner.*